PROOF READER
Filed May 1, 1957
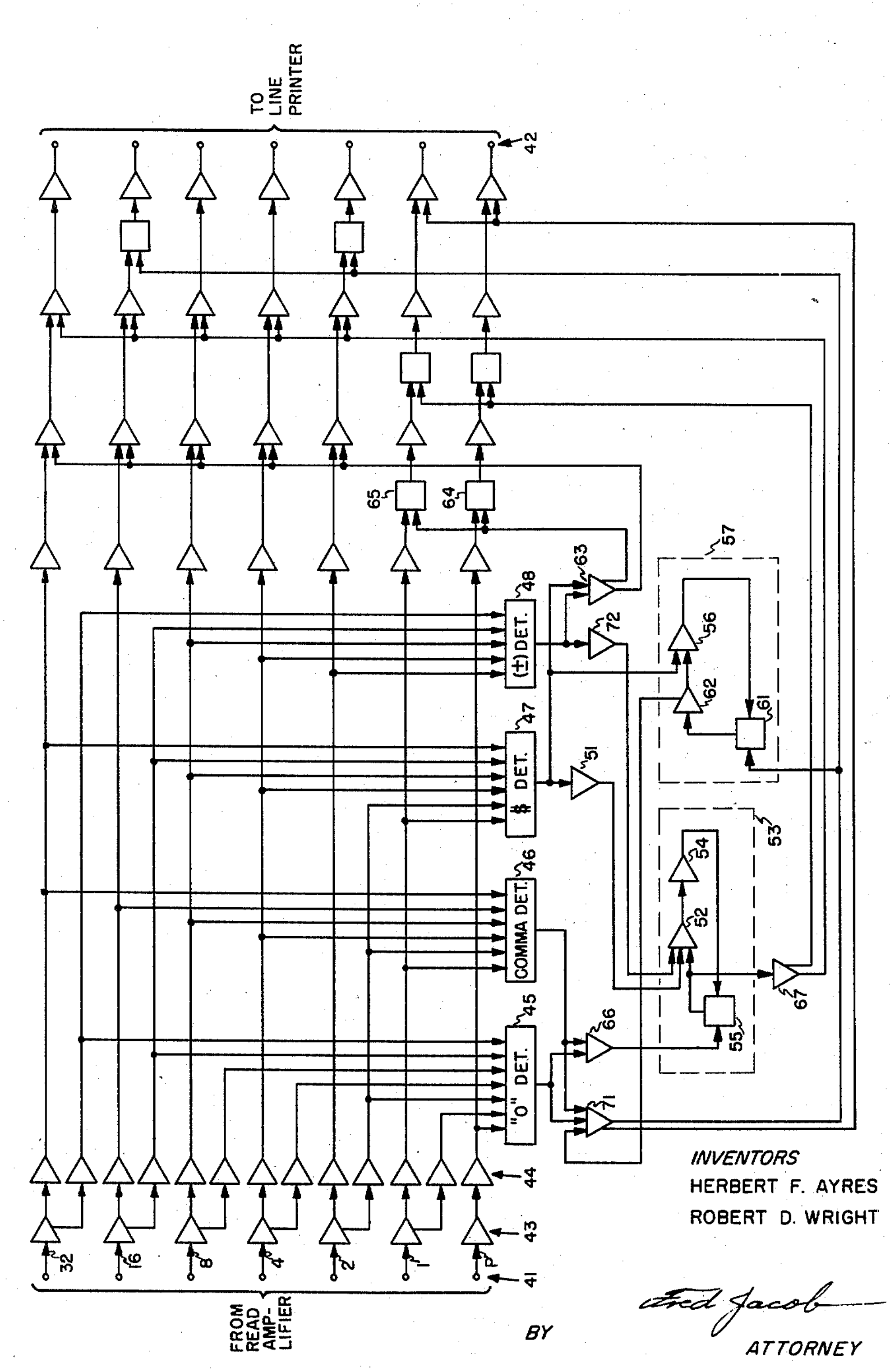
INVENTORS
HERBERT F. AYRES
ROBERT D. WRIGHT
BY Fred Jacob
ATTORNEY United States Patent Office 2,886,803

Patented May 12, 1959

2,886,803

PROOF READER

Herbert F. Ayres, Hingham, and Robert D. Wright, Roslindale, Mass., assignors, by mesne assignments, to Laboratory for Electronics, Inc., Boston, Mass., a corporation of Delaware Application May 1, 1957, Serial No. 656,298

8 Claims. (Cl. 340—174)

The present invention relates to new and improved apparatus for converting data derived from an intermediate stage of a data processing system into the final form required at the output.

In general, for any selectively designated data unit which is received in the direction of most significant digit first (most-first) and whose form is to be changed, the apparatus which forms the subject matter of the present invention automatically carries out the operation by suppressing or changing selected characters. More specifically, the maximum magnitude of a numeric data unit, i.e. the maximum number of digits of a given number which can ordinarily be handled by the computer of a data processing system, is determined by the size of the available equipment. Any numeric data unit which consists of fewer data characters than the aforesaid maximum, is expanded to full size upon entering the computer by the addition of non-significant 0's. These non-significant 0's remain a part of the data unit when the latter is transferred out of the computer and is punctuated. In the case of numeric data units, i.e. numbers, punctuation is understood to include the insertion of a decimal point and commas. If the number represents a monetary value, e.g. dollars, the punctuation process also provides a dollar sign in front of the first digit.

It is generally desirable to suppress these non-significant data characters, i.e. the non-significant 0's and commas pertaining thereto, and to float the dollar sign up to a point immediately preceding the first significant data character of the number, as the latter appears in final form at the output of the data processing system.

In the past, the dollar sign of a number was frequently retained in the position in which it was received, while non-significant data characters were suppressed so as to create spaces. In the final printed output form, e.g. on a check, these spaces were left blank. Alternatively, each space was filled with a symbol such as a star, indicative of the absence of a significant data character. Improved legibility, customer convenience, reduction of ease of fraudulent altering and the reduced chance of error in reading make it desirable to float the dollar sign up to the first significant data character of the number. Prior attempts at devising apparatus for carrying out this function in a digital data processing system have resulted in complicated systems which usually require additional instructions for their operation. Generally, these systems include some form of matrix storage in the memory portion of the data processing system. Thus, additional instructions are provided by the stored matrix of the number which is to be changed to a desired form. For example, where a dollar sign is to be placed immediately in front of the most significant digit of a number by the use of this system, the instruction to do so must be provided in the matrix. Where data storage capacity is limited such an arrangement is clearly undesirable. More significantly, it limits the overall speed of operation, as time must be allotted for programming, i.e. for placing the matrix in the proper position in the memory system.

Accordingly, it is a primary object of this invention to provide simple and economical apparatus for examining the output data of the computer of a data processing system and for placing it into a form desired at the printed output.

It is another object of this invention to provide a proof reader in a data processing system for automatically examining selected data units of the data stream issuing in the most-first direction from the output of the computer and for placing them into a form desired at the final output.

It is a further object of this invention to provide a proof reader in a data processing system which requires no additional instructions in order to examine each number received at the output of the computer and to place a data character, descriptive of the numeric quantity, immediately in front of the first significant digit of said number.

It is an additional object of this invention to provide a proof reader in a data processing system which automatically examines each number received at the computer output, rejecting the non-significant data characters thereof and placing a sign descriptive of the currency employed immediately in front of the first significant digit.

These and other novel features of the invention together with further objects and advantages thereof will become more apparent from the following detailed specification with reference to the accompanying drawing, the sole figure of which illustrates a preferred embodiment of the invention in schematic form.

By the convention adopted with reference to the drawing, an amplifier is indicated by a triangle, a line emanating from the apex being representative of the direct signal output, while a line issuing from one of the sides indicates the logically inverted signal output. An "and" gate is represented by a square or a box and requires a pulse on every one of its inputs in order to deliver a pulse at the output. A buffer is indicated by one or more arrow heads entering the base of a triangle and requires a signal on only one of the inputs in order to produce an output signal. The function of the apparatus shown in the drawing is to transfer the data received from the "read" amplifier which constitutes a preceding stage of the data processing system, into a form desired at the printed output. The data is received in punctuated form from the "read" amplifier and arrives in the most-first direction at input terminals 41. Thus, if the arriving number represents a monetary value, the dollar sign will precede the first digit therein. As received from the "read" amplifier, the aforesaid number may have non-significant data characters preceding its first significant digit. This is due to the operation of the computer, as described above. The dollar sign will precede all the data characters of the numbers whether significant or non-significant, non-significant data characters including commas which separate groups of non-significant zeros. The symbols used in the present invention to indicate the end of a data unit are (+) or (−) signs which follow the last data character thereof. These signs serve the additional function of separating successive data units and, in the case of numbers, they may also be employed in the algebraic sense. It is the specific function of the apparatus shown in the drawing to place the dollar sign immediately in front of the first significant digit of the number received, and to eliminate the non-significant data characters as well as the (+) and (−) signs which separate respective numbers. The illustrated embodiment of the present invention achieves this result in four distinct operations:

(1) The dollar sign preceding the number received from the "read" amplifier is suppressed and remembered.

(2) The non-significant data characters following the dollar sign are suppressed.

(3) The dollar sign is inserted immediately before the first significant digit of the number.

(4) The (+) or (−) sign terminating the number is suppressed.

As shown in the drawing, binary digital data arriving at input terminals 41 from the read amplifier proceeds to output terminals 42 by way of several intermediate stages of amplification. In the illustrated embodiment of the invention, saturable magnetic amplifiers are used. Accordingly, each amplifier also denotes a delay of one half bit period. The binary code employed uses six bits plus a parity check bit to represent each data character. The appropriate data paths are labeled 32, 16, 8, 4, 2, 1 and P respectively, where P stands for the parity check bit. The applicable binary code for some of the data characters used is given in the chart below:

*Code chart*

| Data Character | Bits | | | | | | |
|---|---|---|---|---|---|---|---|
| | 32 | 16 | 8 | 4 | 2 | 1 | P |
| "0" | 0 | 0 | 0 | 0 | 0 | 0 | 1 |
| (−) | 0 | 0 | 1 | 1 | 1 | 0 | 0 |
| (+) | 0 | 0 | 1 | 1 | 1 | 1 | 1 |
| $ | 1 | 0 | 1 | 1 | 0 | 1 | 1 |
| Comma | 1 | 1 | 1 | 1 | 0 | 1 | 0 |
| Space | 1 | 1 | 1 | 1 | 1 | 0 | 0 |

Binary Ones are conventionally represented by pulses, while binary Zeros are represented by the absence of pulses. After being delayed for one bit period by amplifiers 43 and 44, the data is examined by a series of detectors. Each of the latter constitutes a gate and is connected to different paths of the data stream so as to uniquely detect one or more predetermined data characters. Thus, "0" detector 45 is connected to the inverted output of each signal path, except the parity bit path to which it is directly connected. It will be seen by reference to the above chart that the appearance of the character "0" will cause a pulse to appear on every one of the inputs of detector 45, causing the latter to open and to produce an output signal. Detectors 46 and 47 are connected to the data stream so as to uniquely recognize the appearance of commas and dollar signs respectively. Detector 48 is connected to recognize the appearance of (+) signs as well as (−) signs and to yield a pulse in response to the appearance of either sign.

In operation, when a dollar sign preceding a punctuated numeric word appears at the output of amplifiers 44, an output pulse derived from dollar sign detector 47 passes to amplifier 51 and is buffered to the input of amplifier 52 in flip-flop circuit 53. The latter unit stores the pulse by periodically recirculating it via amplifier 54 and gate 55. The output pulse of detector 47 is also buffered to the input of amplifier 56 in flip-flop circuit 57, where it is stored by circulation via gate 61 and amplifier 62. The output pulse of detector 47 is further fed to amplifier 63, the inverted output of which is connected to gates 64 and 65 respectively. The latter gates fail to open in response to this signal and hence, a binary Zero (i.e. the absence of a pulse) appears in the parity and "1" paths respectively. Since each one of the other paths is connected to the direct output of amplifier 63, it will contain a binary One. It will be seen with reference to the above chart, that the signals thus combine to suppress the existing data character by inserting a "space" code into the data stream. Thus, the dollar sign is initially suppressed by virtue of the action of "space" code generating amplifier 63.

The pulse in flip-flop 53 continues to circulate as long as gate 55 remains open. The latter condition is dependent upon the receipt of signals from amplifier 66 which, in turn, receives input signals from detectors 45 and 46 respectively. Thus, as long as non-significant data characters, i.e. either 0's or commas, are received after the appearance of the dollar sign, gate 55 remains open, the pulse in flip-flop 53 continues to circulate and amplifier 67 receives input pulses. The latter, by virtue of its connection to the respective data paths, generates a "space" code for each non-significant data character, which code is inserted into the data stream with due regard to proper timing, in similar fashion to the space codes generated by amplifier 63. The output signals of detectors 45 and 46 respectively, are buffered to the input of amplifier 71. Additionally, the inverted output signal of amplifier 62, which is Zero as long as the pulse stored in flip-flop 57 recirculates, is buffered to the input of amplifier 71. The output of the latter amplifier is so connected to the respective data paths, that the occurrence of non-significant data characters produces no effect upon the data stream. The direct output pulses of amplifier 71 are applied to gate 61 to keep the latter open, whereby the stored pulse continues to circulate in flip-flop 57. The appearance of the first significant digit of the number in the data stream causes a binary Zero to be applied at the input of amplifier 71. The responsive output signal is such that a "dollar sign" code is inserted into the data stream immediately preceding the first significant digit. The direct output signal of amplifier 71 being binary Zero, gate 61 to which it is applied closes and the circulation of the pulse in flip-flop 57 ceases. The inverted output signal of amplifier 62 now represents a binary One, which is applied to the input of amplifier 71 to restore the previous condition and to prevent the insertion of another dollar sign into the data stream. The appearance of the first significant digit of the number also cuts off the pulses applied at the input of amplifier 66 which, in turn, causes gate 55 to close. As a result, amplifier 67 no longer generates "space" codes to suppress arriving data characters.

The appearance of a (+) or (−) sign indicative of the end of the number is detected by detector 48 and causes amplifier 63 to generate a "space" code, thereby suppressing the sign. Additionally, amplifier 72 passes a pulse to amplifier 52, which pulse is subsequently recirculated in flip-flop 53. In this case, the subsequently arriving dollar sign preceding the next number in the data stream has no further effect on the operation of flip-flop 53. Except for the first number in a larger data unit, e.g. a block of data, where the initial dollar sign starts the recirculation of a pulse in flip-flop 53, the (+) or (−) sign which indicates the end of a number is equally useful for initiating the recirculation of the aforesaid pulse.

Under certain conditions it is desirable to preserve the (+) and (−) signs in the printed output for their algebraic meanings. Means are provided which prevent the suppression of these signs in the final output whenever this situation arises.

It will be seen that the underlying principles of the present invention are equally applicable to any dogmatic most-first operation. Thus, the invention is not limited to the flotation of the dollar sign of a number up to a point immediately preceding the first significant digit thereof, but may be utilized whenever it is desired to move the data character which initiates the data unit immediately in front of a first selected character of the data unit. In fact, the present invention may be utilized whenever it is desired to change the form of a data unit which is received in the most-first direction.

Having thus described the invention, it will be apparent that numerous modifications and departures, as explained above, may now be made by those skilled in the art, all of which fall within the scope contemplated by the invention. Consequently, the invention herein disclosed is to be construed as limited only by the spirit and scope of the appended claims.

What is claimed is:

1. In a data processing system apparatus for altering the form of selectively designated data units transferred along a data path, each of said designated data units consisting of respective data characters including first and second chosen characters, said apparatus comprising means connected to said data path for suppressing said first chosen character, means connected to said suppression means for remembering said first character, means connected to said data path for suppressing all data characters intermediate said first and second chosen characters, and means connected intermediate said means for remembering and said data path for inserting said first chosen character into the data stream immediately preceding said second chosen character.

2. Apparatus for altering the form of selectively designated data units transferred along a data path, each of said designated data units consisting of data characters, said apparatus comprising means connected to said data path for selecting a predetermined data character in each of said designated data units, means connected to said data path for suppressing all the characters of the data unit preceding said selected character, means connected to said suppressing means for remembering the first character suppressed, and means connected intermediate said means for remembering and said data path for inserting said first character immediately preceding said selected character.

3. Apparatus for altering the form of selected data units in a data stream, each of said designated units consisting of significant and non-significant data characters, means for suppressing the first significant data character of each selected data unit, means for storing the data character so suppressed, means for suppressing each of said non-significant data characters, and means for inserting said first suppressed data character as the first character of the altered data unit.

4. Apparatus for altering the form of selected data units transferred along a data path, each of said data units consisting of respective data characters which move serially in said data path in the most-first direction, each of said data units comprising significant and non-significant data characters, means connected to said data path for suppressing the first data character of each data unit, means for storing said suppressed character, means connected to said data path for suppressing the non-significant data characters following said first character, and means connected intermediate said storage means and said data path responsive to the appearance of the next significant data character for inserting said stored data character immediately preceding said next significant data character.

5. In a data processing system providing a data stream comprising respective data units, each of said data units consisting of data characters moving serially in the most-first direction, said data units including punctuated numbers comprising significant and non-significant data characters, the first data character of each of said numbers being descriptive of the numeric quantity represented by the number, means for suppressing said descriptive data character, means for storing a signal representative of said descriptive data character, means for suppressing the non-significant data characters following said descriptive data character, and means responsive to the appearance of the next significant data character to insert said descriptive data character immediately preceding said next significant data character.

6. In a data processing system having a data stream of respective data units, each of said data units consisting of data characters moving serially in the most-first direction, each of said data characters being encoded by a plurality of electrically represented binary digits, a signal path corresponding to each of said binary digits, respective signal paths being connected in parallel, the movement of said binary digits in said parallel signal paths constituting said data stream, said data units including punctuated numbers comprising significant and non-significant data characters, the first data character of each of said numbers being descriptive of the numeric quantity represented by the number, means for detecting the appearance of said descriptive data character in said data stream, means for suppressing said descriptive data character and storing a representative signal, means for detecting the appearance of the non-significant data characters following said descriptive character in said data stream, means for suppressing said non-significant data characters, and means responsive to the appearance of the next significant data character to insert said descriptive character immediately preceding the latter in the data stream.

7. The apparatus of claim 6 wherein each of said data units further comprises a data character indicative of the termination thereof, means for detecting said termination data character in said data stream, means for suppressing said termination data character, and means responsive to the appearance of said termination data character for storing a signal representative of the descriptive data character pertaining to the succeeding data unit.

8. In a data processing system having a data stream of respective data units, each of said data units consisting of data characters moving serially in the most-first direction, each of said data characters being encoded by a plurality of electrically represented binary digits, a signal path corresponding to each of said binary digits, respective signal paths being connected in parallel, the movement of said binary digits in said parallel signal paths constituting said data stream, said data units including punctuated numbers having significant and non-significant data characters, the first data character of each of said numbers being descriptive of the numeric quantity represented by the number, each of said numbers being succeeded by a termination character, a plurality of detectors connected to said paralell signal paths for uniquely recognizing the codes of divers data characters, each of said detectors comprising a plurality of gates for producing an output pulse upon the appearance of the appropriate data character, a first flip-flop circuit capable of storing a pulse by periodically recirculating the same, said first flip-flop circuit being connected to a first pair of said detectors such that pulse circulation is initiated upon the appearance of the code of either a quantity-descriptive character or a termination character in said data stream, a first code generator connected between said first flip-flop circuit and said parallel signal paths to insert space codes into said data stream while said pulse is circulating, said first flip-flop circuit being connected to a second pair of said detectors such that pulse circulation continues as long as 0's and commas appear in said data stream, a second code generator connected between said first pair of detectors and said parallel signal paths to insert a space code into said data stream upon the appearance of either one of the data characters recognized by said first pair of detectors and in place thereof, a second flip-flop circuit capable of storing a pulse by periodically recirculating the same, said second flip-flop circuit being connected to one of said first pair of detectors such that pulse circulation is initiated upon the appearance of said quantity-descriptive character in said data stream, a third code generator connected between said second pair of detectors and said parallel signal paths such that the code for a quantity-descriptive character is inserted immediately preceding the first significant data character upon the latter's appearance following non-significant 0's and commas, said third code generator being further connected to said second flip-flop circuit so as to terminate pulse circulation in the latter upon the appearance of said first significant data character, said second flip-flop circuit additionally being connected to said third code generator to prevent the insertion of more than one quantity-descriptive character code per data unit.

No references cited.